(12) United States Patent
Wankmueller

(10) Patent No.: US 6,857,566 B2
(45) Date of Patent: Feb. 22, 2005

(54) METHOD AND SYSTEM FOR CONDUCTING TRANSACTIONS USING A PAYMENT CARD WITH TWO TECHNOLOGIES

(75) Inventor: John Wankmueller, Great Neck, NY (US)

(73) Assignee: Mastercard International, Purchase, NY (US)

(*) Notice: Subject to any disclaimer, the term of this patent is extended or adjusted under 35 U.S.C. 154(b) by 0 days.

(21) Appl. No.: 10/302,976

(22) Filed: Nov. 25, 2002

(65) Prior Publication Data

US 2003/0121969 A1 Jul. 3, 2003

Related U.S. Application Data

(60) Provisional application No. 60/337,913, filed on Dec. 6, 2001.

(51) Int. Cl.[7] .................................................. G06K 5/00
(52) U.S. Cl. ........................... 235/380; 705/44; 705/67; 380/25
(58) Field of Search .......................... 235/379, 380–384, 235/462.01, 487, 492; 705/35, 41–44, 64, 67, 75; 380/28, 30; 713/168, 170, 182

(56) References Cited

U.S. PATENT DOCUMENTS

| | | | |
|---|---|---|---|
| 4,066,873 A | 1/1978 | Schatz | 235/487 |
| 4,697,073 A | 9/1987 | Hara | 235/487 |
| 5,225,977 A | 7/1993 | Hooper et al. | 364/401 |
| 5,466,919 A | 11/1995 | Hovakimian | 235/380 |
| 5,511,114 A | 4/1996 | Stimson et al. | 379/114 |
| 5,623,552 A | 4/1997 | Lane | 382/124 |
| 5,748,737 A | 5/1998 | Daggar | 380/24 |
| 5,880,452 A | 3/1999 | Plesko | 235/472 |
| 6,028,920 A * | 2/2000 | Carson | 379/114.2 |
| 6,112,981 A | 9/2000 | McCall | 235/375 |
| 6,315,195 B1 | 11/2001 | Ramachandran | 235/380 |
| 6,318,633 B1 | 11/2001 | Drexler | 235/454 |
| 2001/0001856 A1 * | 5/2001 | Gould et al. | 705/39 |
| 2002/0046116 A1 * | 4/2002 | Hohle et al. | 705/14 |

FOREIGN PATENT DOCUMENTS

| | | | | |
|---|---|---|---|---|
| JP | 2001-076117 A | 3/2001 | | G06K/19/08 |
| WO | WO 92/16913 | 1/1992 | | G06K/19/06 |

\* cited by examiner

Primary Examiner—Diane I. Lee
(74) Attorney, Agent, or Firm—Baker Botts L.L.P.

(57) ABSTRACT

A system for conducting financial transactions is provided wherein payment cards have stored account information including a first portion readable by a first machine-readable technology and a second portion readable by a second different machine-readable technology. Terminals employing both of said first and second technologies are used to capture said card account information for conducting each such transaction.

3 Claims, 2 Drawing Sheets

METHOD AND SYSTEM FOR CONDUCTING TRANSACTIONS USING A PAYMENT CARD WITH TWO TECHNOLOGIES

This application is based on U.S. provisional application No. 60/337,913 filed on Dec. 6, 2001, entitled "Method and System for Conducting Transactions Using a Payment Card With Two Technologies," which is hereby incorporated by reference.

BACKGROUND OF THE INVENTION

This invention relates to a method and system for conducting financial transactions using payment cards having account information stored therein and readable by two different technologies.

In today's marketplace, payment cards—such as credit, debit, and prepaid cards—are ubiquitous methods of payment. As used in this application, the term "payment card" includes not only payment cards in ISO 7810 ID-1 form factor, but also any other form factors that may hold payment account information, such as mobile phones, personal digital assistants (PDAs), and key fobs.

Most payment cards in use today use a magnetic stripe on the card to store payment account information for authorizing a transaction. Typically, to authorize a payment, the payment card is swiped through a card reader that reads the account information from the magnetic stripe on the card.

A drawback associated with the use of a magnetic stripe payment card is that it may be relatively time consuming and/or difficult to handle for certain applications. For example, when a consumer desires to pay for gasoline at the pump, the consumer typically wishes to conduct a fast transaction. The fact that a consumer must align the magnetic stripe on the payment card in the correct orientation for a card reader and swipe the payment card in a certain direction with a certain velocity means that a consumer must often fumble with the card to align it properly and may need to swipe the card more than once before the card reader is able to properly read it. In this situation, therefore, a conventional payment card may not be as fast and/or convenient a payment mechanism as a consumer might desire. The same also applies to purchases of fast food at fast food restaurants and convenience items at convenience stores.

To overcome the lack of speed and/or handling convenience of payment cards in the situations mentioned above, some companies have introduced other methods of payment. For example, the Exxon Mobil Oil Company has introduced the SPEEDPASS device. The SPEEDPASS device uses a radio frequency (RF) transmitter. that transmits an identification code to an RF receiver installed either at the gas pump or at a payment register. To use the SPEEDPASS device, a user waves the device in close proximity to the RF receiver at the pump or register and waits for a light to indicate that the RF receiver has received and processed the identification code.

While convenient, the drawback with RF payment devices is the possibility of unauthorized reading of the identification information from these devices. That is, a person may utilize a concealed or camouflaged RF reader to steal the identification information from a user's RF payment device and use the stolen information to later conduct fraudulent transactions. To avoid unauthorized reading of the identification information, the information may be transmitted in encrypted form. Secure encryption, however, can be complicated and/or expensive, especially if a global deployment and global acceptance of payment cards is desired.

In addition, another drawback to the SPEEDPASS device is that it is only usable in a closed loop acceptance system (i.e., it is only usable at Mobil-supported terminals). It does not have the global acceptance of a payment card usable within a global payment network, such as the BANKNET network operated by MasterCard International Incorporated.

Therefore, there exists a need for a payment device and mechanism that is quick, easy, fast and secure and globally interoperable.

SUMMARY OF THE INVENTION

According to the presently claimed invention, a payment device includes payment account information that is distributed between two different machine-readable technologies. Preferably, the payment device according to the presently claimed invention includes one or more digits of a payment account number stored in the payment device in a first machine-readable technology and the remaining digits of the payment account number, if any, and other payment account information stored in the payment device in a second machine-readable technology different from the first machine-readable technology. The payment account information may be split between the two technologies in any manner and the split line may even be (as described above) within the payment account number itself.

Preferably, the first machine-readable technology is barcode technology and the second machine-readable technology is radio-frequency (RF) technology. While these are the preferred technologies, the first and second machine-readable technologies may be any technology known in the art, so long as different technologies are chosen. For example, in addition to bar code and RF technologies, the machine-readable technologies may be magnetic stripe, optical character recognition (OCR), audio-tone and infrared technologies.

Advantageously, with the presently claimed invention, if a person attempts to perform an unauthorized reading of the payment device (also known as "skimming") using one technology, the person will not be able to read the entire payment account information and cannot later use the skimmed data to conduct a fraudulent transaction. For example, assume that a payment card has a payment account number stored therein in bar-code technology and other payment account information (such as the expiration date) stored therein and readable by RF technology. If a person attempts to commit fraud by skimming account information from an RF transmission from the payment card, the person will not be able to use the skimmed account information because the payment account number is not transmitted over the RF channel. Therefore, the presently claimed invention provides a more secure manner of conducting a payment transaction.

BRIEF DESCRIPTION OF THE DRAWINGS

Exemplary embodiments of the present invention will now be described in detail with reference to the accompanying drawings in which.

DETAILED DESCRIPTION OF THE INVENTION

The present invention is directed to a payment device and method that provides a quick, easy, fast and secure way to pay for transactions. According to the presently claimed invention, a payment device includes payment account information that is distributed between two different machine-readable technologies. Preferably, the payment device according to the presently claimed invention includes one or more digits of a payment account number stored in the payment device in a first machine-readable technology and the remaining digits of the payment account number, if any, and other payment account information stored in the payment device in a second machine-readable technology different from the first machine-readable technology. The payment account information may be split between the two technologies in any manner and the split line may even be (as described above) within the payment account number itself. Preferably, the first machine-readable technology is bar-code technology and the second machine-readable technology is radio-frequency (RF) technology. While these are the preferred technologies, the first and second machine-readable technologies may be any technology known in the art, so long as different technologies are chosen. For example, in addition to bar code and RF technologies, the machine-readable technologies may be magnetic stripe, optical character recognition (OCR), audio-tone and infrared technologies. In many instances, one technology by itself would not be secure enough to protect payment transactions, but when data is split between two technologies in one device, payment transactions can be more securely supported.

Figure 1:
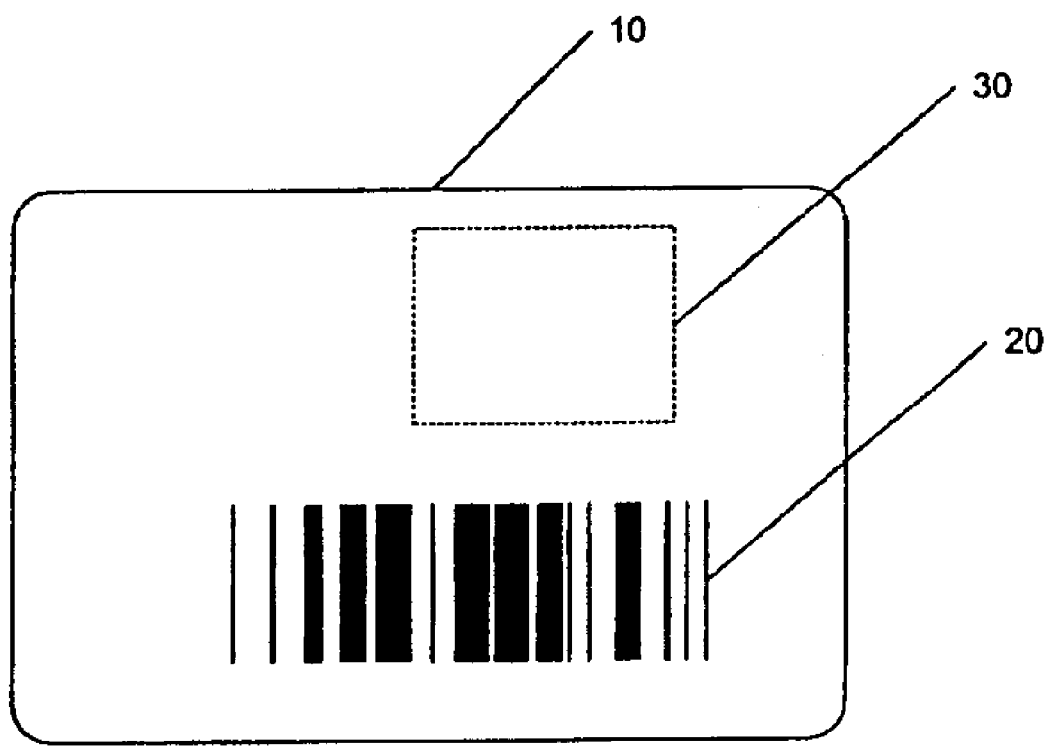
FIG. 1 is a diagram of a payment card according to an exemplary embodiment of the present invention.

FIG. 1 is a diagram of a payment card according to a preferred embodiment of the present invention. As shown in FIG. 1, the present invention utilizes a payment card 10 with a bar code 20 thereon and radio frequency ID chip or circuitry 30 therein. The bar code may be graphically printed, imprinted or placed on the card in any manner known in the art. The bar code is encoded with at least one or more digits of the payment account number (PAN). Preferably, the bar code is encoded with, at a minimum, the most significant digits of the PAN, including the BIN used to identify the issuer. A BIN (bank identification number) is a unique series of numbers that identifies the issuer of a card and which is used to route authorization request messages over existing payment card networks, such as the BANKNET network from MasterCard International Incorporated.

The remaining account information is stored in the RF chip or circuitry 30. If a partial PAN is encoded in the bar code, the RF chip or circuitry 30 includes the remaining digits of the PAN. Preferably, the RF chip or circuitry also includes the "Track 2" data typically found on the magnetic stripe of conventional payment cards except for the full PAN. Excluding the PAN, the Track 2 data typically includes the expiration date, a service code, and discretionary data (i.e., data defined by the issuer of the card). Specifically, the Track 2 data is in BCD format and contains 40 BCD characters consisting of 1) a start sentinel (1 BCD character); 2) a PAN (of up to 19 BCD characters); 3) a field separator (1 BCD character); 4) an Expiry Date (4 BCD characters), 5) a Service Code (3 BCD characters); 6) discretionary data (the length of which is dependent on the length of the PAN); 7) end sentinel (1 BCD character); and 8) longitudinal redundancy check (LRC) (1 BCD character). The length of the discretionary data field is dependent on the length of the PAN. For a standard 16-digit payment account number, there are 13 digits available for the discretionary data. Of course, while Track 2 is preferred, other data tracks on the magnetic stripe may also be used with the present invention.

To use the card, a conventional point-of-sale (POS) or other payment terminal may be equipped with both an optical bar code reader that reads the bar code on the payment card and an RF receiver to receive the RF information. The information read using the two different technologies from the card is then combined in the reader into regular track data and processed in the same manner as a conventional payment card over existing payment networks. Preferably, the bar code reader used is an omnidirectional bar code reader so that the payment card/device of the present invention need not be aligned in any specific orientation with regard to the reader. Since payment account digits are communicated via the bar code, this payment card/device would not suffer from the same potential for theft of information as an RF-only payment device.

While a preferred distribution arrangement for payment account information has been described, payment account information may be distributed in any manner between the two technologies on the payment card, so long as the reading of the account information stored in one technology does not compromise the account. In practice, since mail order and telephone order transactions may use only the PAN and the expiry date, it is preferred that the PAN and expiry date not be readable using the same technology.

Figure 2:
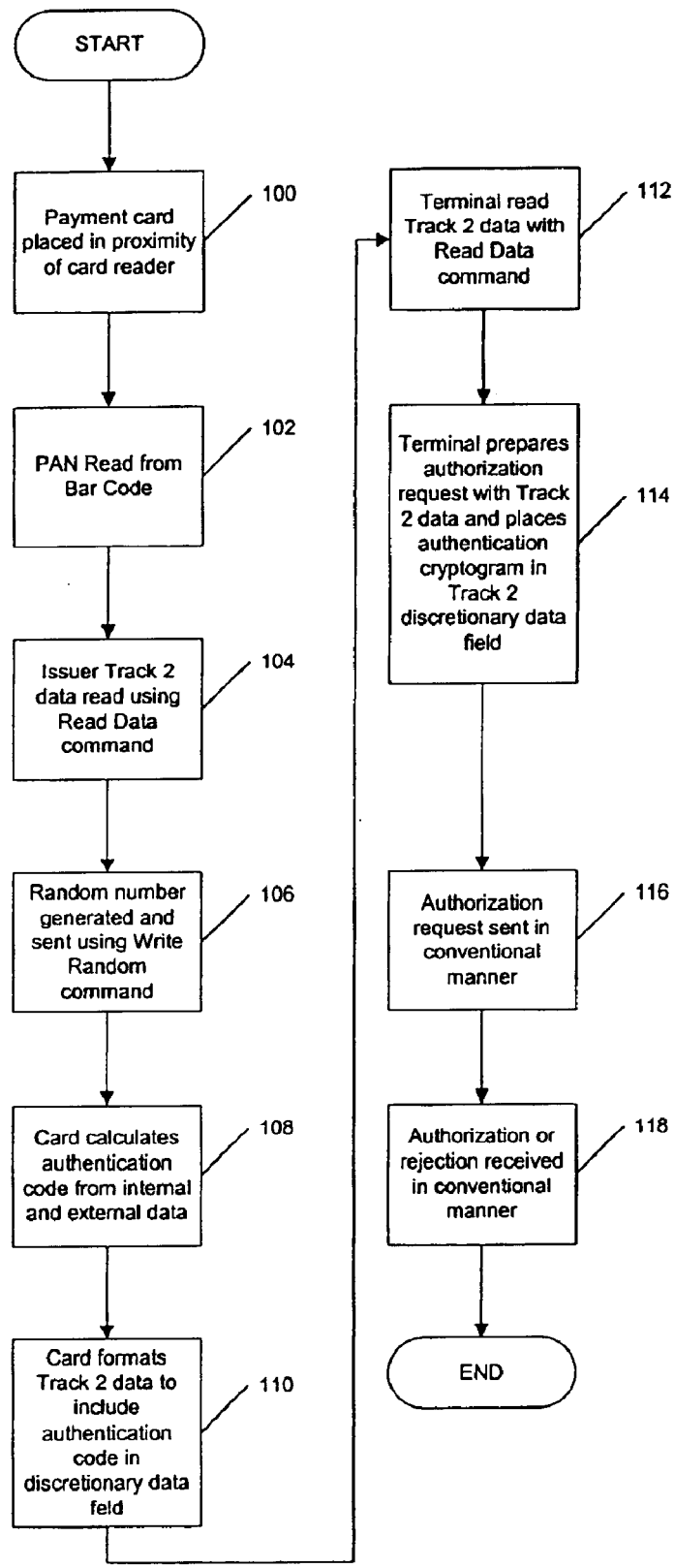
FIG. 2 is flow chart of an authorization and authentication process between a payment card and a terminal according to a preferred embodiment of the present invention.

FIG. 2 is a flow chart of an authorization and authentication process between a payment card and a terminal according to a preferred embodiment of the present invention. Preferably, the payment card used in FIG. 2 includes both an optical bar code and an RF ID chip. Preferably, the RF ID chip performs the following functions:

securely store a unique per-card cryptographic key;

support a cryptographic algorithm to calculate an authentication code;

maintain a transaction counter and increment the transaction counter before a predefined event, such as before each transaction or after each time a challenge number is presented to the card;

store Track 2 data (as issued by the payment card issuer);

format the Track 2 discretionary data field with the chip-calculated authentication data; and support the following commands for the transaction processing:

Write Data. This command is needed to send a challenge number produced by the terminal to the RF ID device. Upon receipt of the challenge number, the RFID device should increase its transaction counter, calculate the authentication code, and format Track 2 discretionary data with the chip authentication data. The terminal challenge number may be a random number or it may be fixed (for example, to be the last two digits of the terminal serial number).

Read Data. This command is needed to read Track 2 data. When the Read Data command is performed before the Write Data command, the chip returns Track 2 data as stored in the device without authentication data. This can accommodate specific encoding, like a language code, which may be found in some Track 2 discretionary data on current cards, which would allow the terminal to interact with the cardholder in the cardholder's chosen language. When the Read Data command is performed after the Write Data command, the chip returns Track 2 with the discretionary data replaced with the authentication data.

Preferably, the RF chip calculates an authentication code for verification by the issuer using its unique cryptographic authentication key and the following data:

the PAN digits, if any, from the RF chip Track 2 data;

the Expiry Date (4 BCD characters) from the RF chip Track 2 data;

the Service Code (3 BCD characters) from the RF chip Track 2 data;

the value from the counter maintained by the RF chip (preferably, the counter is a minimum of 15 bits); and the challenge number (preferably 2 BCD characters) provided by the terminal.

The preferred method for calculating an authentication code is the following:

1. Construct a string of bits by concatenating (left to right) the four rightmost bits of each digit of the PAN if any, the Expiry Date (4×4=16 bits), and the Service Code (3×4=12 bits). Also concatenate to the bit string the Radio Frequency Chip counter (15 bits) and the challenge number (2×4=8 bits) provided by the terminal. Pad the bit string with binary zeros to a multiple of 64 bits (total of 128 bits).

2. Calculate a MAC (message authentication code) using the Radio Frequency Chip secret and unique authentication key (single or double length) using DES.

3. Map the hexadecimal result of step 2 above into a set containing groups of 3 numeric digits. Use the 3 numeric digits resulting from the mapping operation as the authentication code.

The Radio Frequency Chip (or optionally the terminal) preferably converts the 15-bit Radio Frequency Chip counter to BCD as follows:

1. Select the leftmost 3 bits of the counter add a zero bit to the left and convert to BCD.

2. Select the next 3 bits of the counter add a zero bit to the left and convert to BCD.

3. Perform step 2 an additional 3 times to translate the 15 bit counter to 5 BCD characters.

Note that using the above method for converting the counter to BCD, each BCD digit will range from 0 to 7. The method is suggested to simplify implementation in a chip. Alternately, the counter can be converted to decimal then to BCD provided that the conversion is done the same on the issuer host system. It would then be possible to increase the size of the binary counter to 20 bits (5 BCD characters, 4 bits per char).

Preferably, the Radio Frequency Chip device replaces the discretionary data of Track 2 with the authentication code (3 BCD characters), the Radio Frequency Chip counter (5 BCD characters), and the terminal challenge number (2 BCD characters), and makes the re-formatted Track 2 data available for reading by the terminal. Preferably, for increased security, it is up to the issuer to allocate the number of characters to be used for the authentication code, counter, and challenge number. Per-issuer allocation can make it harder to decipher the data in the discretionary data field.

Preferably, the terminal in the embodiment of FIG. 2 performs at least the following functions:

Generate a challenge number (as described above), either randomly or a fixed value (preferably coded as 2 BCD characters).

Support the Write Data command to present the challenge number to the Radio Frequency Chip device.

Support the Read Data command. As described above, the Read Data command may be used before or after the Write Data command. If the Read Data command is performed before the Write Data command, the terminal seeks to read Track 2 data from the Radio Frequency Chip as issued by the card issuer. In some countries, for example, a language code or other country specific information is included in the Track 2 discretionary data field, which the terminal may need to operate. If the Read Data command is issued after the Write Data command, the terminal seeks to obtain Track 2 data containing the Radio Frequency Chip authentication data in the discretionary field.

Verify the Track 2 Expiry date and Service Code.

Optionally request the entry of an on-line PIN on a secure PIN-pad for verification by the issuer.

Returning to FIG. 2, in step 100, the payment card is placed in the proximity of the card reader of the terminal to initiate the transaction. The card reader includes both an optical bar code reader and an RF transmitter/receiver. In step 102, the card reader reads the PAN data encoded in the bar code on the payment card.

In step 104 (which could be performed before, after, or simultaneously with step 102), the terminal optionally sends a Read Data command to read the Track 2 data stored in the RF chip. From the Track 2 data, the terminal extracts data it may need to conduct the transaction as, for example, a language code.

In step 106, the terminal sends a Write Data command with a challenge number to the payment card.

In step 108, the RF chip on the payment card calculates an authentication code using its cryptographic key with its internal data (as specified above) and the challenge number sent by the terminal.

In step 110, the RF chip formats the Track 2 data to be sent to the terminal, replacing the discretionary data with the authentication code and other values as d above.

In step 112, the terminal performs a Read Data command and reads the new 2 data, including the authentication code. The Track 2 data does not include PAN. It may include a portion of the PAN if only a portion is encoded in the bar code. In the case where the full PAN is encoded in the bar code, the Track 2 data may include blank or null data in the spaces reserved for the PAN or the PAN data need not be transmitted at all.

In step 114, the terminal prepares an authorization request with Track 2 data. The authorization request Track 2 data is generated from the PAN obtained from the bar code on the payment card and the remaining Track 2 data obtained from the RF chip.

In step 116, the authorization request is sent in a convention manner through one or more existing payment networks. Upon receipt of the authorization request by the issuer of the payment card, the issuer derives the unique cryptographic key assigned to the payment account number and validates the authentication code in the Track 2 discretionary data field. If the authentication is successful and if other authorization parameters are satisfied (e.g., sufficient credit in the cardholder's account), the issuer may authorize the transaction. Otherwise, the issuer may reject the transaction.

In step 118, the authorization response is received at the terminal in a conventional manner through the existing payment networks and the transaction is completed or rejected based on the response.

Although the present invention has been described with reference to certain preferred embodiments, various modifications, alterations, and substitutions will be known or obvious to those skilled in the art without departing from the spirit and scope of the invention.

I claim:

1. A method for conducting a financial transaction over a communications network comprising a terminal, a payment network including a transaction authorization issuer, and a payment card having a chip, comprising:

storing on said card account information having a first portion readable by a first machine-readable technology and a second portion readable by a second different machine-readable technology, said stored account information including a payment account number, an expiration date, a service code, and wherein said chip maintains a transaction counter, and receives a terminal challenge number from the terminal;

securely storing on said chip a unique per-card cryptographic key;

supporting on said chip a cryptographic algorithm for calculating an authentication code using at least said key, said authentication code to be used for verification by said transaction authorization issuer; wherein said authentication code is calculated using at least portions of said unique per-card cryptographic key, said account number, said expiration date, said service code, a value associated with said counter, and said challenge number, and employing both of said first and second technologies to capture said card account information for conducting said financial transaction.

2. The method of claim 1, wherein said stored account information includes Track 2 data comprising said expiration date, said service code, and discretionary data, and wherein said chip is an RF chip which stores said Track 2 data.

3. The method of claim 2, further comprising:

reformatting the discretionary data of said Track 2 data with said authentication code, said transaction counter, and said terminal challenge number; and making said reformatted data available for reading by said terminal.

* * * * *